US009399576B2

(12) United States Patent
Gondal et al.

(10) Patent No.: US 9,399,576 B2
(45) Date of Patent: Jul. 26, 2016

(54) 450 NM VISIBLE LIGHT-INDUCED PHOTOSENSITIZED DEGRADATION OF RHODAMINE B MOLECULES OVER BIOBR IN AQUEOUS SOLUTION

(71) Applicant: King Fahd University of Petroleum and Minerals, Dhahran (SA)

(72) Inventors: Muhammad Ashraf Gondal, Dhahran (SA); Kai Shen, Nanjing (CN); Xiafeng Chang, Nanjing (CN); Zain Hasan Abdallah Yamani, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 65 days.

(21) Appl. No.: 14/154,810

(22) Filed: Jan. 14, 2014

(65) Prior Publication Data
US 2015/0196788 A1    Jul. 16, 2015

(51) Int. Cl.
*C01B 11/20* (2006.01)
*A62D 3/17* (2007.01)
*C01D 3/10* (2006.01)

(52) U.S. Cl.
CPC . *C01B 11/20* (2013.01); *A62D 3/17* (2013.01); *C01D 3/10* (2013.01)

(58) Field of Classification Search
None
See application file for complete search history.

(56) References Cited

FOREIGN PATENT DOCUMENTS

| CN | 101850263 A | 10/2010 |
|---|---|---|
| CN | 101455973 | * 11/2010 |
| CN | 101993043 A | 3/2011 |
| CN | 103007967 A | 4/2013 |
| WO | 2012066545 | * 5/2012 |

OTHER PUBLICATIONS

Ahmad, Ayla "Synthesis and Evaluation of Photocatalytic Properties of BiOBr for Wastewater Treatment Applications". University of Ottawa (2013).*
Yuning Huo, et al., "Solvothermal synthesis of flower-like BiOBr microspheres with highly visible-light photocatalytic performances", Applied Catalysis B: Environmental, vols. 111-112, Jan. 2012, (1 page).
Sanaa Shenawi-Khalil, et al., "A Novel Heterojunction BiOBr/Bismuth Oxyhydrate Photocatalyst with Highly Enhanced Visible Light Photocatalytic Properties", The Journal of Physical Chemistry, 2012, (2 pages).
Lufeng Lu, et al., "Visible-Light-Driven Photodegradation of Rhodamine B on Ag-Modified BiOBr", Catalysis Letters, vol. 142, Issue 6, Jun. 2012 (6 pages).

* cited by examiner

*Primary Examiner* — Melvin C Mayes
*Assistant Examiner* — Sheng H Davis
(74) *Attorney, Agent, or Firm* — Oblon, McClelland, Maier & Neustadt, L.L.P (57) ABSTRACT

A method for degrading Rhodamine B including: mixing BiOBr and Rhodamine B; and irradiating the mixture with a radiation having a wavelength of from 440 nm to 554 nm. The Rhodamine B may be in an aqueous solution. The BiOBr may be added to the aqueous solution of Rhodamine B in an amount of from 0.2 to 0.5 mg/ml. The BiOBr may have a sheet-like structure with particles having a diameter of from 3 $\mu m$ to 5 $\mu m$. The BiOBr may be in a pure crystal tetragonal phase.

17 Claims, 9 Drawing Sheets

450 NM VISIBLE LIGHT-INDUCED PHOTOSENSITIZED DEGRADATION OF RHODAMINE B MOLECULES OVER BIOBR IN AQUEOUS SOLUTION

BACKGROUND

1. Field of the Disclosure

The present invention relates to a method for degrading Rhodamine B in the presence of BiOBr, particularly a method for photodegradation of Rhodamine B using radiation having a wavelength of from 440 to 554 nm, particularly 450 nm monochromatic light.

2. Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Fujishima and Honda reported for the first time the photoelectrochemical water splitting by $TiO_2$- and Pt-coated electrodes under UV light irradiation (Fujishima et al., Nature, 238, 37-38, 1972—incorporated herein by reference in its entirety). This moment is considered as the beginning of many investigations concerning the heterogeneous photocatalysis. Photocatalysis technology is now considered to be a promising approach to solve many energy and environmental problems because of the concept of "low-carbon and green life" (Hoffmann et al., Chem. Rev., 95, 69-96, 1995; Bae et al., Reac. Kinet. Mech. Cat., 106, 67-81, 2012—each incorporated herein by reference in its entirety).

Bismuth oxybromide (BiOBr) has attracted a lot of interest in both experimental and theoretical aspects (Huang et al., Mater. Sci., 43, 1101-1108, 2008—incorporated herein by reference in its entirety), because of its outstanding visible light driven photocatalytic performance as well as the potential applications in environmental remediation, such as treatment of dye-contained textile wastewater (Yu et al., Reac. Kinet. Mech. Cat., 103, 141-151, 2011; Shang et al., J. Hazard. Mater., 167, 803-809, 2009; Jiang et al., J. Photochem. Photobiol. A. Chem., 212, 8-13, 2010; Zhang et al., J. Colloid Interface Sci., 354, 630-636, 2011; Kong et al., Chem. Commun., 47, 5512-5514, 2011—each incorporated herein by reference in its entirety), heavy metal ions (Zhang et al., J. Hazard. Mater., 211-212, 104-111, 2012; Li et al., Eur. Inorg. Chem., 2012, 2508-2513, 2012—each incorporated herein by reference in its entirety), phenol-like pollutants (Zhang et al., J. Colloid Intergace Sci., 354, 630-636, 2011; Chang et al., Catal. Commun., 11, 460-464, 2010; Xu et al., Appl. Catal. B., 107, 355-362, 2011; Tian et al., Catal. Sci. Technol., 2, 2351-2355, 2012—each incorporated herein by reference in its entirety), indoor air pollutants (Ai et al., Environ. Sci. Technol., 43, 4143-4150, 2009—incorporated herein by reference in its entirety) and bacteria (Zhang et al., J. Hazard Mater., 211-212, 104-111, 2012—incorporated herein by reference in its entirety).

Even though the photocatalytic activity of BiOBr has been widely reported in these publications, it is worth mentioning that the contribution on photosensitized degradation performance of BiOBr is very rarely reported. In particular, none of the above publications, taken either singly or in combination, is seen to describe the method of photosensitized degradation of organic dyes in the presence of BiOBr. The photosensitized degradation of Rhodamine B (RhB) dye in the presence of BiOBr reported so far uses a monochromatic 532 nm pulsed laser (Gondal et al., Appl. Catal. A. Gen., 397, 192-200, 2011—incorporated herein by reference in its entirety). However, such a procedure results in a degradation of RhB only under high temperature (>30° C.) and requires relatively large amount of BiOBr (>0.6 mg/mL).

One aspect of the present invention is to provide a method which addresses or overcomes at least some of the aforementioned problems associated with the prior art methods, particularly to provide a method which can more effectively and efficiently degrade RhB molecules.

SUMMARY

The foregoing paragraphs have been provided by way of general introduction, and are not intended to limit the scope of the following claims. The described aspects, together with further advantages, will be best understood by reference to the following detailed description taken in conjunction with the accompanying drawings.

In one embodiment of the present invention, a method for degrading Rhodamine B includes: mixing BiOBr and Rhodamine B; and irradiating the mixture with a radiation having a wavelength of from 440 nm to 554 nm. In one embodiment, the radiation has a wavelength of 450 nm. In one embodiment, the radiation is 450 nm monochromatic light.

In another embodiment of the present invention, the Rhodamine B is in an aqueous solution.

In another embodiment of the present invention, the BiOBr is added to the aqueous solution of Rhodamine B in an amount of from 0.2 to 0.5 mg/ml.

In another embodiment of the present invention, the BiOBr has a sheet-like structure with particles having a diameter of from 3 μm to 5 μm. In one embodiment, the BiOBr is in a pure crystal tetragonal phase.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE EMBODIMENTS

The present invention relates to a method for degrading Rhodamine B (RhB) in the presence of bismuth oxybromide (BiOBr), particularly a method for photodegradation of RhB in the presence of BiOBr. Although there is no intention to be bound by any theory, BiOBr is considered to catalyze the photodegradation of RhB molecules in the method of the present invention.

BiOBr used in the present invention may be prepared from various compounds, including but not limited to: sodium bismuth oxide dihydrate ($NaBiO_3.2H_2O$) and hydrogen bromide (HBr); and bismuth nitrate pentahydrate ($Bi(NO_3)_3.5H_2O$) and cetyltrimethyl ammonium bromide (CTAB), preferably from $NaBiO_3.2H_2O$ and HBr. When BiOBr is prepared from $NaBiO_3.2H_2O$ and HBr, $NaBiO_3.2H_2O$ and HBr are first dissolved in water. Preferably, HBr is dissolved in water to form an aqueous solution of HBr, or hydrobromic acid, and then $NaBiO_3.2H_2O$ is dissolved in the aqueous solution of HBr. Preferably, $NaBiO_3.2H_2O$ is in a powder form and completely dissolved in the aqueous solution of HBr. Distilled water is added to the aqueous solution of $NaBiO_3.2H_2O$ and HBr until light-yellow BiOBr precipitation is obtained. Preferably, the solution is stirred for about 30 minutes. After the precipitation is complete, the resulting BiOBr is separated by centrifugation, washed by water and ethanol, and then dried. The precipitated BiOBr may be dried at 80° C. in the air for a period of 10 hours. BiOBr may also be prepared by a facile precipitation method described in Chang et al., *J. Colloid Interface Sci.*, 377, 291-298, 2012, contents of which are incorporated herein by reference in its entirety.

BiOBr used in the present invention may have a crystal tetragonal structure. Preferably, the BiOBr crystal has a sheet-like structure. Each sheet-like structure may have a diameter of less than 10 μm, preferably from 3 to 5 μm or about 4 μm. Such physical structure of BiOBr may be confirmed by analyzing its X-ray diffraction (XRD) patterns and scanning electron microscope (SEM) images. Examples of preferred structure of BiOBr may include tetragonal BiOBr (JCPDS No.: 78-0348), space group P4/nmm (129). Such BiOBr may have a band gap of 2.8 eV. The band gap of BiOBr may be estimated from its UV-Vis diffuse reflectance spectrum (DRS) by extrapolation of the linear part of Kubelka-Munk function $(ahv)^{1/2}$ verus (hv) plot by the relation (1) shown below (assuming an indirect allowed transition) (Yi et al., *Nat. Mater.*, 9, 559-564, 2010—incorporated herein by reference by its entirety):

$$ahv = K \cdot (hv - E_g)^2 \quad (1)$$

where $a = \ln(I_0/I)/t$, here $\ln(I_0/I)$ is the absorbance and t is the thickness of a sample film, h is the Planck constant, v is the frequency of photons, K is a constant, and $E_g$ is the band gap.

Preferably, BiOBr used in the present invention is a pure phase of BiOBr. As used herein, the term "pure phase" refers to a crystalline structure composed of BiOBr crystal only. For example, BiOBr crystalline structure containing other crystalline structure(s) as an intergrowth is not considered as a "pure phase" BiOBr. Similarly, chemically modified BiOBr is not considered as a "pure phase" BiOBr. In one aspect the pure phase BiOBr is used together with one or more other crystals. It is preferred that the BiOBr is used without any metallic second catalyst or dopant such as Ag particles or other metal particles.

To degrade RhB molecules, RhB is first mixed with BiOBr. RhB and BiOBr may be mixed in the air, or in a liquid, preferably in water. In a preferred embodiment of the present invention, RhB molecules are dissolved in water to form a RhB aqueous solution before mixing with BiOBr. In such an embodiment, BiOBr is mixed into or with the RhB aqueous solution. Due to the insolubility of BiOBr to water, BiOBr crystals mixed into the RhB aqueous solution form a BiOBr/RhB suspension. As used herein, the term "BiOBr/RhB suspension" is intended to mean a solution of RhB in which BiOBr is suspended. The initial concentration of RhB in the RhB aqueous solution is not limited. Usually, preferable degradation results may be obtained when the initial concentration of RhB in the RhB aqueous solution before irradiation is from 5 ppm to 10 ppm. The BiOBr/RhB suspension may be acidic, or slightly acidic.

Preferably, the amount of BiOBr mixed into the RhB aqueous solution is controlled such that the concentration of BiOBr in the BiOBr/RhB suspension will be at least 0.10 mg/mL. Preferably, the concentration of BiOBr in the BiOBr/RhB suspension is from 0.20 to 0.50 mg/mL, more preferably from 0.30 to 0.50 mg/mL. The concentration of BiOBr may be 0.50 mg/mL or more. However, increasing the concentration of BiOBr over 0.50 mg/mL may not substantially enhance the degradation efficiency.

The mixture of BiOBr and RhB, such as the BiOBr/RhB suspension, is then irradiated with visible light. As used herein, "visible light" means light discernible to a human eye, generally light having wavelength(s) between about 400 nm and about 750 nm, or between about 420 nm and about 700 nm. Preferably, the wavelength of the light is chosen from the wavelengths by which RhB is excited whereas BiOBr is not excited. Since RhB is excited most effectively by a wavelength of 554 nm or shorter, it is preferable to irradiate the mixture of BiOBr and RhB such as the BiOBr/RhB suspension with light having a wavelength of 554 nm or shorter, preferably 530 nm or shorter. Since BiOBr semiconductor can be excited by a wavelength shorter than 440 nm, light having a wavelength of 440 nm or longer is preferred.

Thus, in the present invention, the light having a wavelength of from 440 nm to 554 nm is preferred. Preferably, the light is monochromatic light. As used herein, "monochromatic light" means light having a single or substantially single wavelength. The light including wavelengths of ±10 nm, or ±5 nm, may be considered to have substantially single wavelength. In one embodiment of the present invention, monochromatic light having a wavelength of 450 nm is used for the irradiation. In one embodiment the light is radiant, non-coherent non-laser light or, if laser light, non-pulsed laser light.

The BiOBr/RhB suspension may be continuously stirred during the irradiation. Any methods may be used to stir the BiOBr/RhB suspension, including but not limited to manual stirring by hand or by a magnetic stirrer. The BiOBr/RhB suspension may also be continuously shaken during the irradiation by using an orbital shaker.

The irradiation is conducted for a sufficient amount of time to degrade RhB molecules dissolved in the BiOBr/RhB suspension. Preferably, the BiOBr/RhB suspension is irradiated for at least 10 minutes, more preferably for 30 minutes, further more preferably for 60 minutes or more.

In one embodiment of the present invention, more than 70%, 80%, or 85% of RhB molecules are degraded after the irradiation for 60 minutes. More than 40%, or 50%, of RhB molecules may be degraded after the irradiation for 30 minutes. In the context of the present disclosure degradation refers to a chemical change in the RhB molecule that breaks chemical bonds so that the results product has a different chemical structure than RhB.

The irradiation may be conducted at any temperature, preferably at a temperature ranging from about 10° C. to about 35° C., more preferably at room temperature. As used herein, the term "room temperature" indicates a temperature under ordinary conditions, which is generally understood to mean a temperature in a range of from about 15° C. to about 27° C.

After irradiation, BiOBr may be removed from the BiOBr/RhB suspension by centrifugation. To collect BiOBr in the bottom of a container, the BiOBr/RhB suspension may be centrifuged at 4000 rpm in a centrifugation machine.

EXAMPLES

The following examples are intended to illustrate the invention without limiting the scope as a result. Notwithstanding that the numerical ranges and parameters setting forth the broad scope of the invention are approximations, the numerical values set forth in the specific examples are reported as precisely as possible. Any numerical value, however, inherently contain errors necessarily resulting from the standard deviation found in their respective measurements.

Materials

Absolute ethanol, sodium bismuth oxide dihydrate ($NaBiO_3 \cdot 2H_2O$), hydrobromic acid (HBr, 40 wt %), the model compound of RhB, and the radical scavenger 2-propanol were purchased from Sinopharm Chemical Reagent Co., Ltd. (China). Distilled water was used for all the experiments. All the chemicals were of analytical grade and used as received without further purification.

Preparation of Catalyst BiOBr

BiOBr was prepared through a facile precipitation method, by using sodium bismuth oxide dehydrate ($NaBiO_3 \cdot 2H_2O$) and hydrobromic acid (HBr, 40 wt %) as the starting materials (Chang et al., *J. Colloid Interface Sci.*, 377, 291-298, 2012—incorporated herein by reference in its entirety). The crystal structure of the as-prepared sample was confirmed by XRD (Bruker D8 ADVANCE) with Cu-$K_\alpha$ radiation ($\lambda$=1.5418 Å). A SEM image of as-prepared BiOBr was obtained by using a scanning electron microscope (JEOL S4800). The UV-Vis DRS was obtained using a UV-VIS spectrophotometer (VARIAN Cary 100) equipped with integration sphere at room temperature. The spectrum obtained from a pressed pellet was recorded relative to $BaSO_4$ as a reference and the reflectance was converted to $F(R_\infty)$ values according to the Kubelka-Munk theory using the instrument software. The BiOBr powder was pasted on the carbon tape in the form of a very thick film and this was used ultimately as a specimen for the DRS measurement.

Figure 1A:
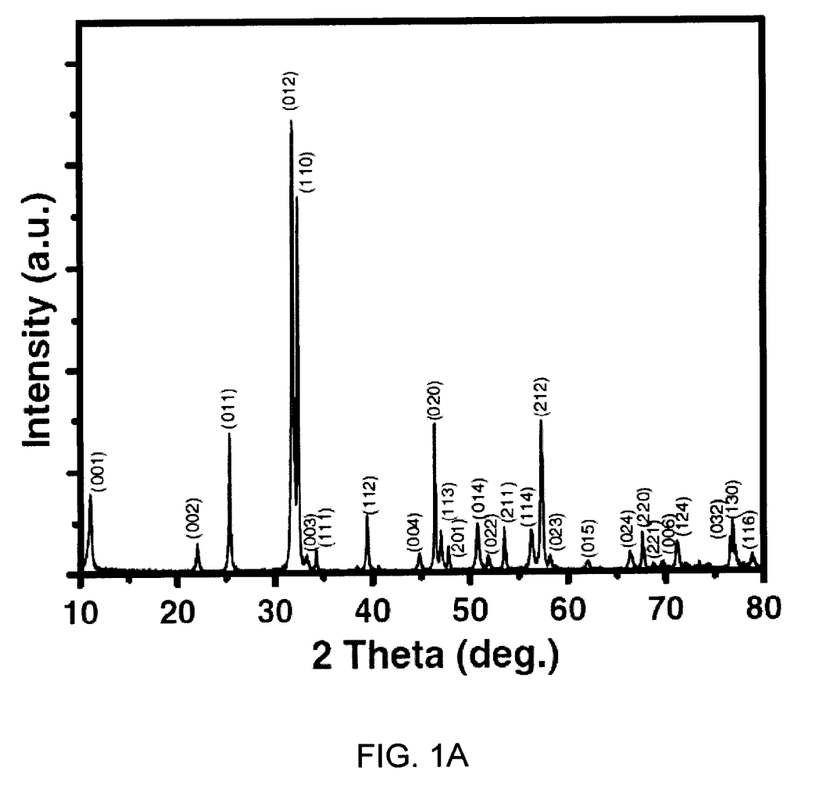
FIGS. 1A-C are XRD patterns, SEM image, and DRS spectrum of as-prepared BiOBr semiconductor with its band gap energy (inset), respectively.
Figure 1B:
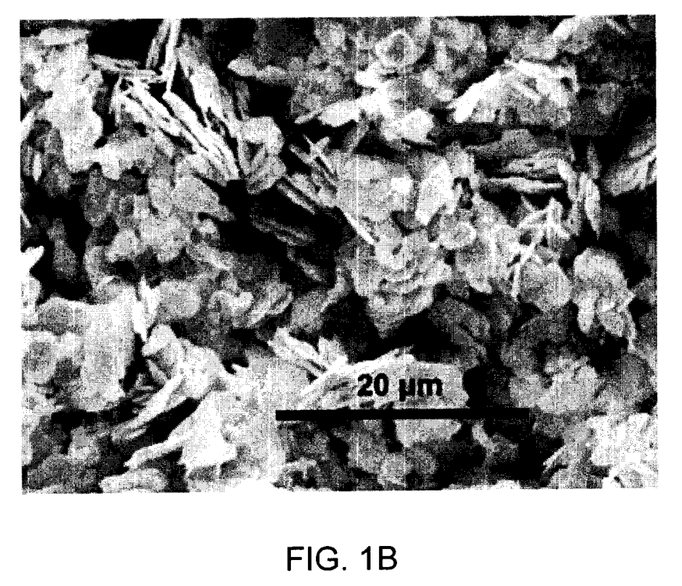
Figure 1C:
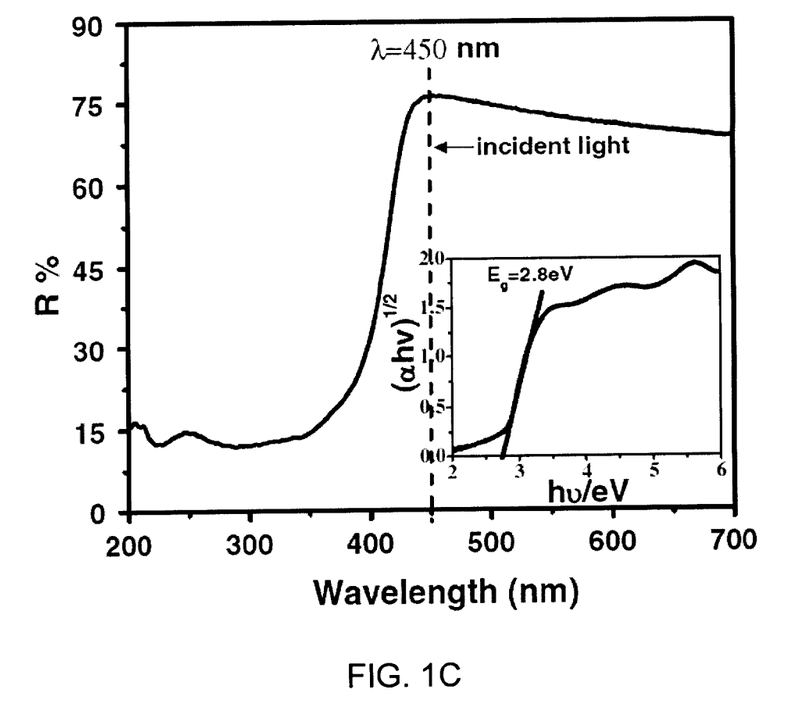

FIG. 1A shows the XRD patterns of the as-prepared BiOBr. The XRD patterns suggested that all the diffraction peaks match well with the crystal structure of the tetragonal BiOBr phase (space group: P4/nmm (129), JCPDS No.: 78-0348). FIG. 1B shows the SEM image of the as-prepared BiOBr. The diameter of as-prepared sheet-like BiOBr catalyst is centered at around 3-5 μm by means of SEM observations as shown in FIG. 1B. As displayed in FIG. 1C, the band gap energy of 2.80 eV was estimated for the as-prepared BiOBr semiconductor compound from extrapolation of the linear part of Kubelka-Munk function $(ah\nu)^{1/2}$ verus $(h\nu)$ plot by the relation (1) shown below (assuming an indirect allowed transition) (Yi et al., *Nat. Mater.*, 9, 559-564, 2010—incorporated herein by reference by its entirety):

$$ah\nu = K \cdot (h\nu - E_g)^2 \quad (1)$$

where $a = \ln(I_0/I)/t$, here $\ln(I_0/I)$ is the absorbance and t is the thickness of the film, h is the Planck constant, v is the frequency of photons, K is a constant, and $E_g$ is the band gap.

Example 1

RhB Removal Under 450 nm Monochromatic Light Irradiation

In this Example, 450 nm monochromatic light was used for the irradiation. For the excitation of electrons from the occupied Valence Band (VB) into the empty Conduction Band (CB), absorption of energy is necessary which is equal or higher than $E_g$, i.e., $h\nu \geq E_g$. From the UV-Vis absorption spectrum of RhB aqueous solution, it is clear that the RhB could be excited most effectively by a wavelength of 554 nm or even shorter, whereas the BiOBr semiconductor can be excited by a wavelength shorter than 440 nm. Therefore, the as-prepared BiOBr semiconductor cannot be excited by the monochromatic light centered at 450 nm, but RhB could be excited under such exposure conditions.

The photodegradation of RhB was carried out in a water (or ice-water mixture)-cooled cylindrical quartz beaker, equipped with an 500 W Xenon-lamp (CHF-XM500W, Beijing Trust Tech Co. Ltd.), a water IR-filter, and a 450 nm band-pass light filter ($\lambda \pm 10$ nm). The beaker was filled with a suspension of BiOBr in RhB aqueous solution with certain dosage and irradiated under continuous stirring condition. Prior to irradiation, the suspension was stirred by stirring in the dark for 1 hour in order to obtain the absorption-desorption equilibrium of RhB. Liquid samples (around 2.5 mL) were taken before and after the lamp irradiation. The experimental conditions were as follows: $C_0$=6 ppm, T=300K (27° C.), pH=5.7. The catalyst BiOBr was removed by centrifugation before the concentration determination of the resulting dye solution by UV-VIS spectrophotometer (VARIAN Cary 100).

Figure 2A:
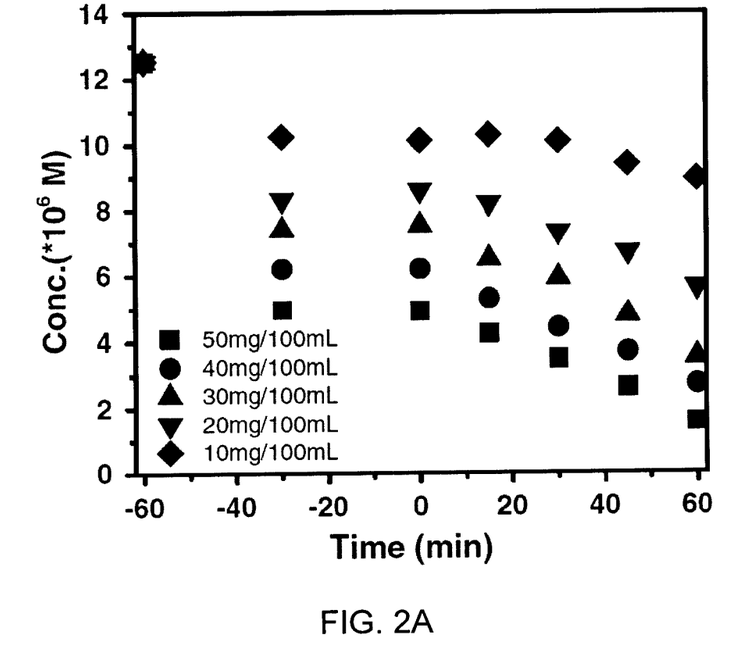
FIG. 2A is a graph depicting variations of RhB concentration (in terms of $C/C_0$) under different BiOBr dosages as a function of irradiation time.

FIG. 2A shows the photodegradation performance of RhB in the presence of BiOBr under 450 nm monochromatic light irradiation. Upon addition of BiOBr with different dosages (from 0.1 to 0.5 mg/mL) in RhB aqueous solutions, the absorbance has decreased apparently by 18-60%, indicating the extent of adsorption of RhB took place on the interface of BiOBr/RhB. Control experiments carried out in a RhB aqueous solution without BiOBr and in BiOBr dispersion in the dark as well, under identical experimental conditions, showed that in the presence of BiOBr, exposure of the RhB solution leads to no change in the absorption peak intensity and even no shift in peak wavelength with increasing irradiation time. After monochromatic light irradiation at 450 nm in the presence of BiOBr, however, the corresponding UV-Vis spectra of the RhB aqueous solution (not shown here) indicated that the well-defined absorption bands of RhB centered at 554 nm gradually weakened with increasing the irradiation time and dosage amount, indicating that RhB had been degraded in the presence of BiOBr only.

It is worth mentioning that the photodegradation process followed apparent zeroth order kinetics, rather than pseudofirst order kinetics, which is considered as a main process in photocatalytic reactions. Therefore, apparent zeroth order kinetics has been considered as an important indication for the photosensitization process (Liu et al., *J. Mol. Catal. A. Chem.*, 153, 221-229, 2000; Liu et al., *Environ. Sci. Technol.*, 33, 2081-2087, 1999—each incorporated herein by reference in its entirety).

Example 2

RhB Removal in Different BiOBr Dosages

Figure 2B:
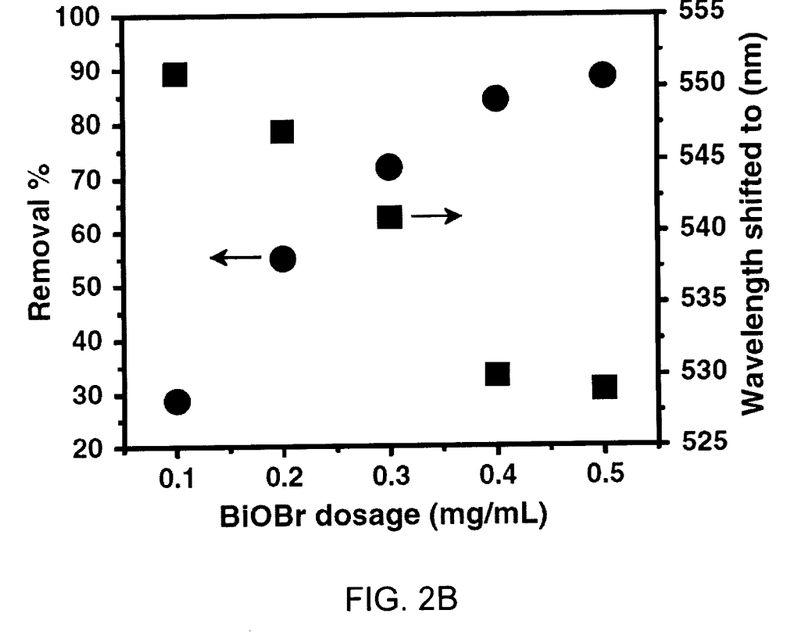
FIG. 2B is a graph showing effects of BiOBr dosage on the RhB removal efficiency (●) and shift of RhB adsorption peak (■).

The corresponding kinetic rates under different catalyst dosages are shown in TABLE 1 and FIGS. 2A and 2B. As expected, it was found that as the dosage of BiOBr increases, the removal efficiency increases, but almost reaches the saturation limit up to the value of 0.4 mg/mL (around 85% of removal efficiency was achieved and the wavelength of the characteristic peak of RhB was shifted from 554 to 530 nm). A further increase in catalyst dosage could not contribute to the apparent enhancement of removal process, which is in agreement with previous investigations on others photodegradation systems (Gondal et al., *Appl. Catal. A. Gen.*, 397, 192-200, 2011; Chen et al., *Water Res.*, 32, 3223-3234, 1998; Gondal et al., *Chem. Eng. J.*, 165, 250-257, 2010—each incorporated herein by reference in its entirety).

TABLE 1

| Effects | Dosage (mg/mL) | $k_0$ (mol/L/min) | r |
|---|---|---|---|
| Dosage effect | 0.1 | 0.02197 | 0.73662 |
| | 0.2 | 0.04933 | 0.97525 |
| | 0.3 | 0.06476 | 0.98037 |
| | 0.4 | 0.05717 | 0.99814 |
| | 0.5 | 0.05569 | 0.99115 |

Example 3

RhB Removal in Different Reaction Temperatures

Figure 3A:
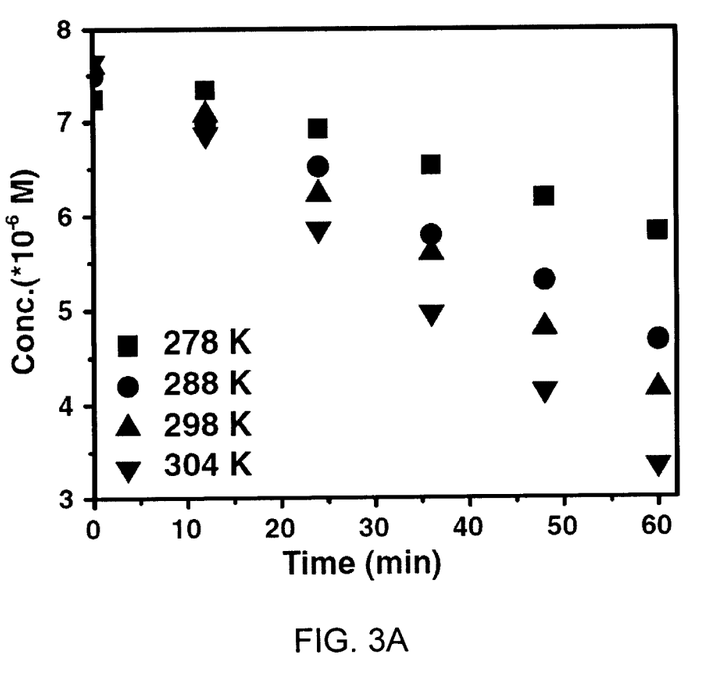
FIG. 3A is a graph depicting variations of RhB concentration (in terms of $C/C_0$) at different temperatures as a function of irradiation time.
Figure 3B:
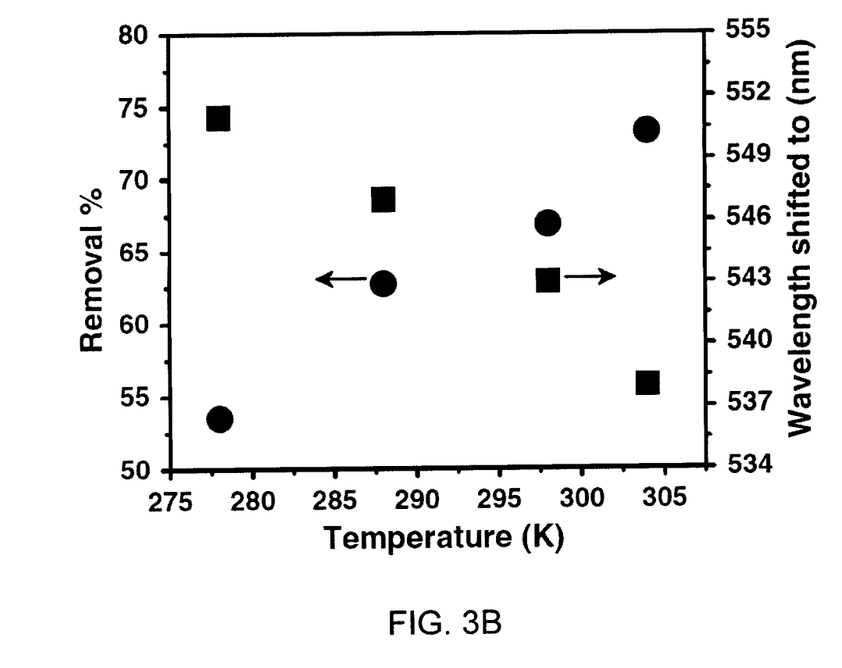
FIG. 3B is a graph showing effects of temperature on the RhB removal efficiency (●) and shift of RhB adsorption peak (■).

The dependence of removal efficiency of RhB from an aqueous solution on the reaction temperature was investigated as well, and the corresponding results are depicted in FIGS. 3A and 3B. The experimental conditions were as follows: $C_0$=6 ppm, BiOBr dosage=0.04 g/120 mL (0.33 mg/mL), pH=5.7, irradiation time=1 h. Apparently, the reaction temperature has a large effect on both the adsorption and photodegradation process. The adsorption removal efficiency decreases from 43 to 39% with increasing the adsorption temperature from 278 to 304 K (4.85 to 30.85° C.), revealing the exothermic nature of the adsorption processes. On the contrary, it was found that increasing the reaction temperature could boost the photodegradation activity, demonstrating the endothermic characteristics of the photodegradation process. From TABLE 2, it can be noticed that the constant k increases from 0.02608 to 0.0728 mol/L/min by increasing the reaction temperature from 278 to 304 K (4.85 to 30.85° C.), indicating an almost threefold enhancement in terms of rate constant. The removal efficiency can be increased from 53 to 73%, which means an almost 20% improvement in photodegradation. Meanwhile, the extent of blue shift in the absorption spectra of RhB was increased from 3 to 16 nm through increasing the reaction temperature.

TABLE 2

| Effects | T (K (° C.)) | $k_0$ (mol/L/min) | r |
|---|---|---|---|
| Temperature effect | 278 (4.85) | 0.02608 | 0.93118 |
| | 288 (14.85) | 0.04731 | 0.99553 |
| | 298 (24.85) | 0.0588 | 0.99668 |
| | 304 (30.85) | 0.0728 | 0.99812 |

Example 4

Arrhenius Activation Energy and Standard Enthalpy/Entropy Change

Figure 4A:
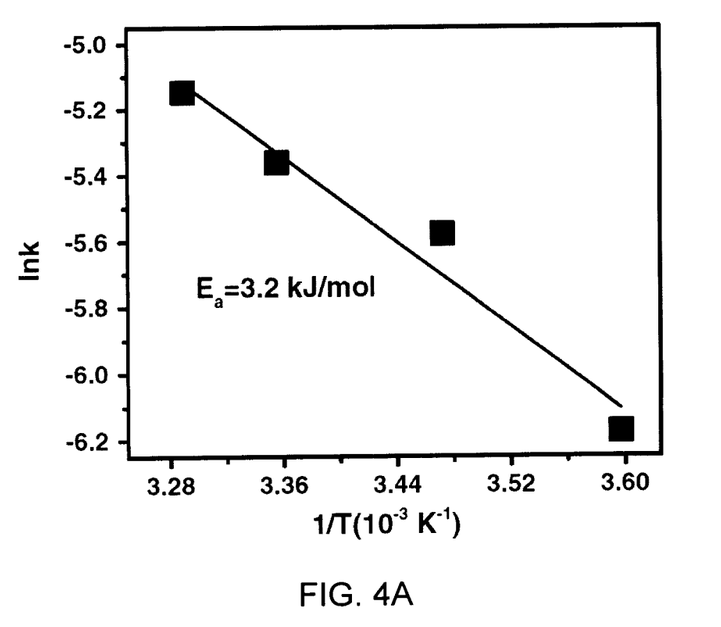
FIGS. 4A and B are graphs of Arrhenius (lnk vs. 1/T) plot, and Eyring (ln(k/T) vs. 1/T) plot, respectively, for photodegradation of RhB.

The rare constant of photodegradation can be described as a function of temperature by the Arrhenius type relationship which is expressed as follows (Eyring, *J. Chem. Phys.*, 3, 107-115, 1935—incorporated herein by reference in its entirety):

$$\ln k = \ln A - \frac{E_a}{RT} \quad (2)$$

where k (mol/L/min) is the apparent zeroth order kinetic constant, $E_a$ is the Arrhenius activation energy (kJ/mol), A is the Arrhenius factor, R is the gas constant (8.314 J/mol/K), and T is the temperature of the solution (K). Therefore, $E_a$ was calculated by plotting ink versus 1/T, which gave an $E_a$ 3.2 kJ/mol as depicted in FIG. 4A. The experimental conditions used in this Example were as follows: $C_0$=6 ppm, BiOBr dosage=0.04 g/120 mL (0.33 mg/mL), pH=5.7, irradiation time=1 h.

Figure 4B:
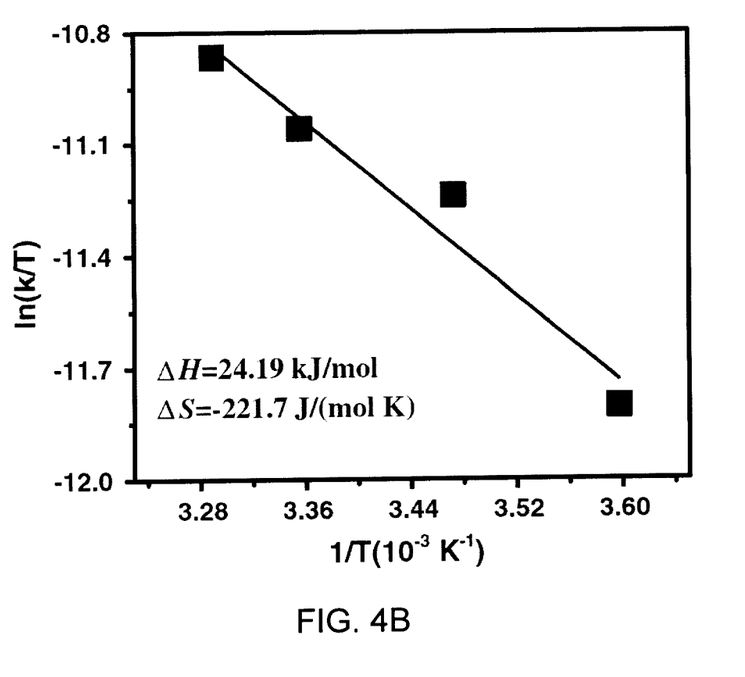

The dependence of apparent zeroth order rate constant k on reaction temperature can be expressed as follows (Eyring-type plot) (Lente et al., *New J. Chem.*, 29, 759-760, 2005—incorporated herein by reference in its entirety):

$$\ln \frac{k}{T} = -\frac{\Delta H}{R} \cdot \frac{1}{T} + \ln \frac{K_b}{h} + \frac{\Delta S}{R} \quad (3)$$

where $K_b$ is the Boltzmann constant (1.381×10⁻²³ J/K), T is the absolute temperature (K), h is the Plank constant (6.626× 10⁻³⁴ Js), k is the apparent zeroth order rate constant, and $\Delta H$ and $\Delta S$ are the standard enthalpy and entropy change, respectively. As shown in FIG. 4B, the data can be fitted to a straight line, and the $\Delta H$ and $\Delta S$ can be estimated as 24.19 kJ/mol and −221.7 J/K/mol. The positive and negative values of $\Delta H$ and $\Delta S$ indicated the endothermic and irreversible characteristic of the photodegradation process.

Example 5

Photocatalytic Activity in the Presence of .OH

As reported by Warneck and Wuzinger (Warneck et al., *J. Phys. Chem.*, 92, 6278-6283, 1988—incorporated herein by reference in its entirety) that 2-propanol was applied to scavenge .OH radical which is described in the following reaction:

Similarly, ethanol was considered as a .OH radical scavenger as well and its reaction with .OH radical could form acetaldehyde, acetic acid, or 1,4-butanediol (Walling et al., *J. Am. Chem. Soc.*, 93, 4275-4281, 1971—incorporated herein by reference in its entirety).

Figure 5:
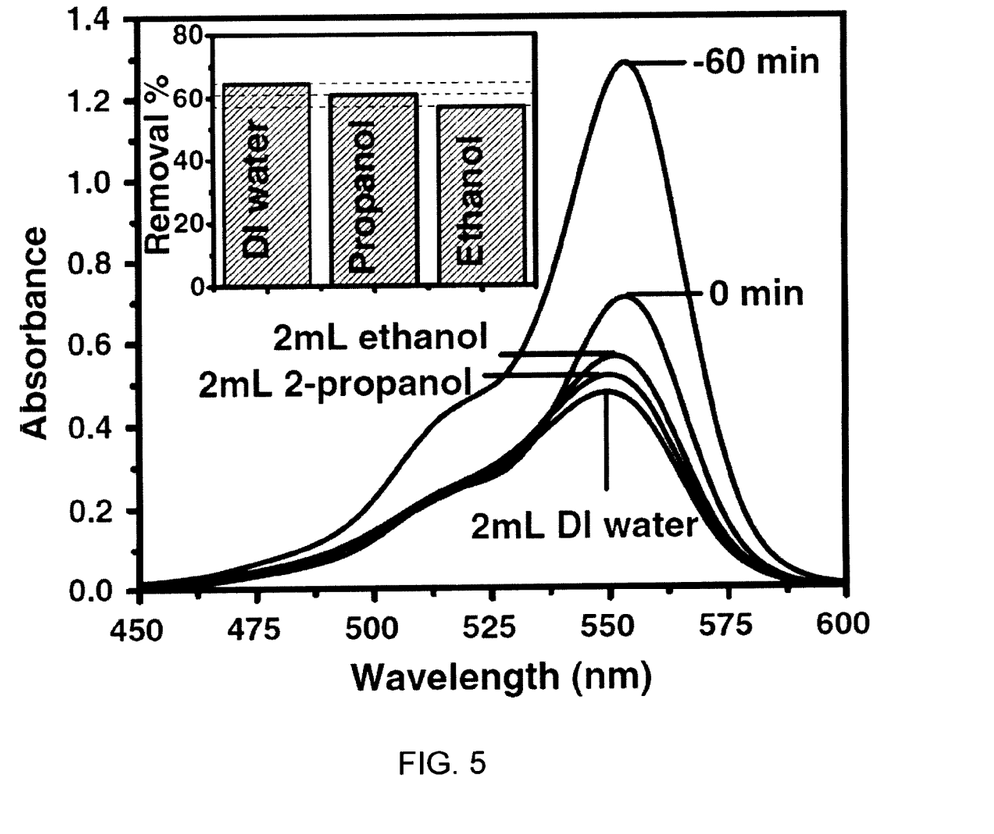
FIG. 5 is a graph depicting effect of .OH free radical scavengers on the RhB removal efficiency (inset) and the UV-Vis spectra.

Therefore, in order to understand the possible photodegradation process further, a comparison of the photocatalytic activity in the presence of 2-propanol or ethanol (which were chosen as .OH scavengers) was carried out. The experimental conditions were as follows: $C_0$=6 ppm, BiOBr dosage=0.04 g/120 mL (0.33 mg/mL), T=300 K (27° C.), irradiation time=40 min, pH=5.7. It is deduced from the results shown in FIG. 5 that the addition of 2-propanol or ethanol has a negative influence on the photodegradation efficiency of RhB, indicating that the adopted scavengers can consume .OH in aqueous solution thus to block the photochemical reaction. The results suggest that .OH might be one of the dominant photooxidants in the photodegradation process.

Example 6

Photostability of BiOBr

To test the photostability of as-prepared BiOBr, a particular amount of the as-prepared BiOBr sample was repeatedly used in several sequential RhB photodegradations under 450 nm monochromatic light exposure. The experimental conditions were as follows: BiOBr dosage=0.01 g/25 mL (0.40 mg/mL), $C_0$=6.8 ppm, T=300 K (27° C.). In order to minimize catalyst loss, the quartz beaker was replaced by a centrifuge tube. The BiOBr powder can be well separated from the RhB solution through centrifugation by this setup.

Figure 6A:
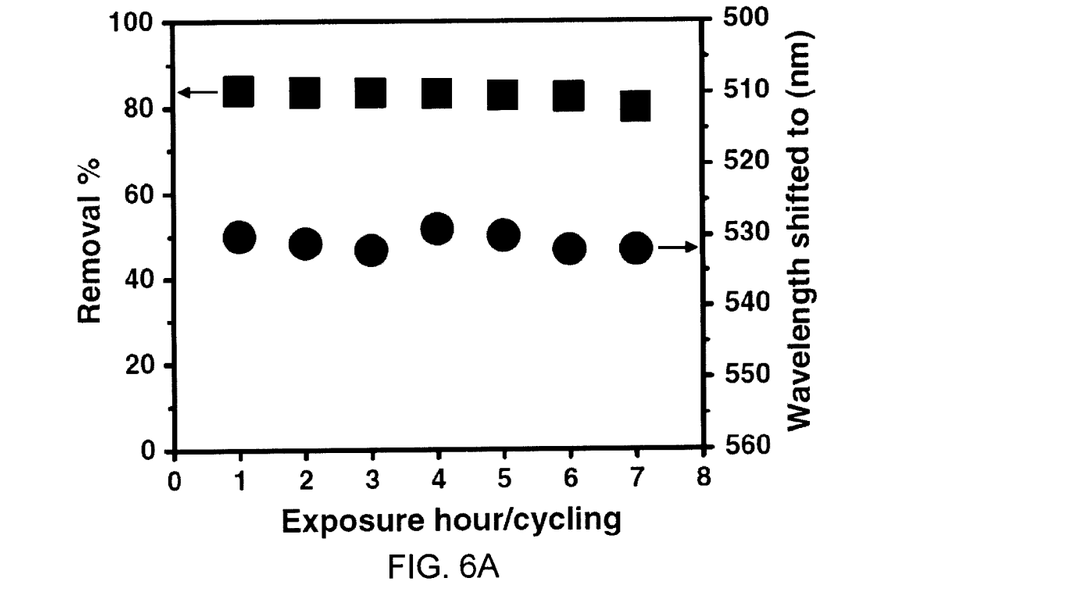
FIGS. 6A-C are graphs depicting: durability of BiOBr catalyst from the repeatable photodegradation of dye solution under 450 nm monochromatic light irradiation; UV-Vis spectal changes of mix-dye solution as a function of different cycles; and XRD patterns of BiOBr before and after 7 hours of exposure, respectively.
Figure 6B:
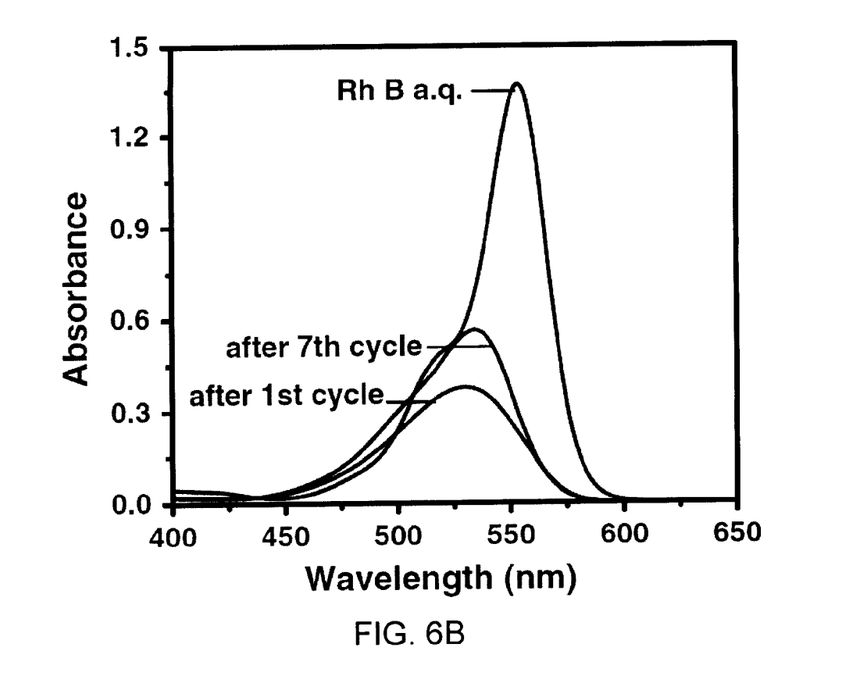

As depicted in FIG. 6A, it can be concluded that the photodegradation activity of as-prepared BiOBr decreases slowly. Around 83% removal efficiency of RhB was achieved after the first reaction cycle, and after seven reaction cycles, it can be found that the removal efficiency of RhB can still amount to around 80% which is only a little less compared with the result of first cycle reaction. As shown in FIG. 6B, after the first and seventh cycling reactions, it can be found that the wavelength of the characteristic peaks of RhB solution were shifted from 554 to 530 nm and 532 nm, respectively. The results discussed above suggest that BiOBr exhibited an excellent photostability for long exposure of 450 nm monochromatic light.

Figure 6C:
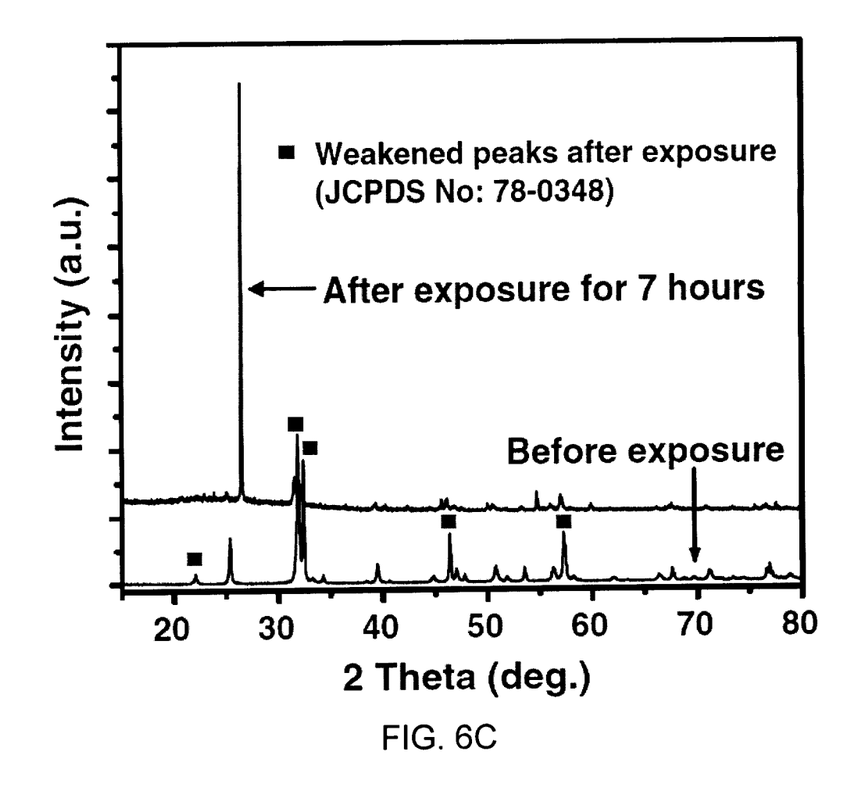

Moreover, as shown in FIG. 6C, it can be found that the as-prepared BiOBr sample did not exhibit XRD pattern changes for most of the diffraction peaks after many uses and experiments. It is worth noticing that the intensity of a few diffraction peaks at 25.35°, 31.76°, 32.40°, 46.48°, 57.41°, which correspond to the crystal indexes of (101), (102), (110), (200), and (212), have been dramatically weakened after 7 hours of exposure, which could be possible due to the photocorrosion process. It was also surprising to note that a new diffraction peak at 26.36° appeared after a long exposure. The reasons for such phenomenon are still under investigation.

Example 7

HOMO and LUMO of RhB

Figure 7:
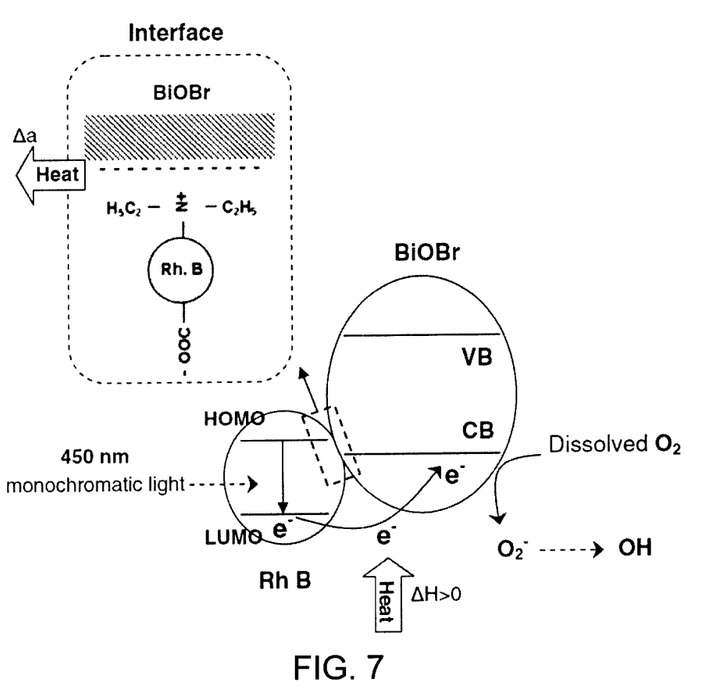
FIG. 7 shows possible mechanism of the 450 nm monochromatic light-induced photodegradation of Rhodamine B molecules over BiOBr in an aqueous solution.

Under visible light irradiation, the photodegradation of RhB molecules on the surface of BiOBr semiconductors may occur due to photochemical sensitization mechanism. By means of B3LYP and MP2 approaches in the Gaussian 03 program, the frontier molecular orbitals (highest occupied molecular orbital (HOMO) and lowest unoccupied molecular orbital (LUMO)) of RhB have been calculated (Chang et al., *J. Colloid Interface Sci.*, 377, 291-298, 2012—incorporated herein by reference in its entirety). A possible process and mechanism for the photodegradation of RhB molecules from the aqueous solution phase on BiOBr catalyst can be achieved on the basis of above discussions. It has been reported that the isoelectric point of the BiOBr semiconductor is around 2.2, suggesting that the BiOBr particles surface zeta potential is almost close to zero when the pH is around 2.2. In the previous investigation, the RhB aqueous solution with a concentration of 6 ppm was used and the initial pH value of the solution was around 5.8. Thus, it can be deduced primarily that the BiOBr surface might be negatively charged and the static electric force adsorption mechanism could possibly have taken place between the negatively charged BiOBr surface and positively charged RhB molecule (as illustrated in FIG. 7). When a RhB molecule absorbs a photon of 450 nm, the photo-generated electron (from LUMO) might transfer to the conduction band of as-prepared BiOBr, which has a much more positive LUMO value (−2.207 eV). The electron that is transferred from dye molecules to the conduction band of the semiconductor can be picked up by the dissolved oxygen in water producing a hydroxyl radical, which is a strong oxidant (this has been confirmed as a endothermic process).

In the foregoing Examples, the 450 nm monochromatic light-induced photodegradation kinetics, thermodynamics, possible mechanism and photostability of RhB on un-excited BiOBr from aqueous solution were investigated. It was found that the photodegradation process followed apparent zeroth order kinetics (Example 1). Almost around 85% removal efficiency was achieved by using BiOBr dosage of 0.4 mg/mL at room temperature (300 K (27° C.)), while the characteristic peak wavelength of RhB was shifted from 554 to 530 nm (Example 2). Temperature-dependent photodegradation experiments suggest that the adsorption and photodegradation process are exothermic and endothermic nature, respectively (Example 3). The Arrhenius activation energy, standard enthalpy and entropy change were also calculated at 3.2, 24.19 kJ/mol and −221.7 J/K/mol (Example 4). The results also suggest that BiOBr exhibited an excellent photostability for a long (≥7 hours) exposure of 450 nm monochromatic light (Example 6).

The foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, define, in part, the scope of the foregoing claim terminology such that no inventive subject matter is dedicated to the public.

What is claimed is:

1. A method for degrading Rhodamine B comprising:
    mixing BiOBr and an aqueous solution of Rhodamine B; and
    irradiating the mixture with a radiation having a wavelength of from 440 nm to 554 nm,
    wherein the BiOBr is added to the aqueous solution of Rhodamine B in an amount of from 0.2 to 0.5 mg/ml, and
    wherein the BiOBr has a sheet-like structure with a diameter of from 3 μm to 5 μm.

2. The method of claim 1, wherein the aqueous solution of the Rhodamine B is free of hydroxyl radical scavengers.

3. The method of claim 1, wherein the mixture is irradiated with a radiation having a wavelength of 450 nm.

4. The method of claim 3, wherein the radiation is monochromatic light.

5. The method of claim 1, wherein the mixture is irradiated at a temperature of from 5° C. to 27° C.

6. The method of claim 1, wherein the BiOBr is in a pure crystal tetragonal phase.

7. The method of claim 1, wherein the BiOBr has a band gap of 2.8 eV.

8. The method of claim 1, wherein the BiOBr is synthesized from sodium bismuth oxide dihydrate and hydrobromic acid.

9. The method of claim 1, wherein at least 80% of the Rhodamine B is degraded after the irradiation for a period of 60 minutes.

10. The method of claim 1, wherein the Rhodamine B is photosensitized by the irradiation.

11. The method of claim 1, wherein BiOBr is the only catalyst present in the mixture during the mixing and the irradiating.

12. The method of claim 1, wherein the BiOBr is added to the aqueous solution of Rhodamine B in an amount of from 0.3 to 0.5 mg/ml.

13. The method of claim 1, wherein the BiOBr is added to the aqueous solution of Rhodamine B in an amount of from 0.4 to 0.5 mg/ml.

14. The method of claim 1, wherein an initial concentration of RhB in the RhB aqueous solution is from 5 to 10 ppm.

15. The method of claim 1, further comprising, after the irradiating, removing BiOBr from the mixture by centrifugation.

16. The method of claim 1, wherein the BiOBr has a sheet-like structure with a diameter of about 4 μm.

17. The method of claim 8, wherein the BiOBr is synthesized by fully dissolving sodium bismuth oxide dihydrate in an aqueous solution of hydrobromic acid, and adding water to precipitate the BiOBr.

* * * * *